US012784710B2

(12) United States Patent
Nashizawa

(10) Patent No.: US 12,784,710 B2
(45) Date of Patent: Nov. 3, 2026

(54) IMAGE PROCESSING APPARATUS AND IMAGE PROCESSING METHOD

(71) Applicant: CANON KABUSHIKI KAISHA, Tokyo (JP)

(72) Inventor: Hiroaki Nashizawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 147 days.

(21) Appl. No.: 18/391,983

(22) Filed: Dec. 21, 2023

(65) Prior Publication Data

US 2024/0233679 A1 Jul. 11, 2024

(30) Foreign Application Priority Data

Jan. 10, 2023 (JP) ................................ 2023-001914

(51) Int. Cl.
*G09G 5/10* (2006.01)
*G06T 5/50* (2006.01)
*G06T 5/92* (2024.01)

(52) U.S. Cl.
CPC ................ *G09G 5/10* (2013.01); *G06T 5/50* (2013.01); *G06T 5/92* (2024.01);
(Continued)

(58) Field of Classification Search
CPC ............... G09G 5/10; G09G 2320/066; G09G 2320/0673; G06T 5/92; G06T 5/50; G06T 2207/20208
(Continued)

(56) References Cited

U.S. PATENT DOCUMENTS 11,587,491 B1 * 2/2023 DeFilippis ........... H04N 9/3147
2019/0141229 A1 * 5/2019 Kamiya ............... H04N 23/741
(Continued)

FOREIGN PATENT DOCUMENTS

JP 2021090109 A 6/2021

OTHER PUBLICATIONS

Report ITU-R BT.2408-5, "Guidance for operational practices in HDR television production," Mar. 2022, retrieved from https://www.itu.int/dms_pub/itu-r/opb/rep/R-REP-BT.2408-5-2022-PDF-E.pdf.

*Primary Examiner* — David T Welch
(74) *Attorney, Agent, or Firm* — Venable LLP

(57) ABSTRACT

An image processing apparatus functions as an acquisition unit to acquire a Perceptual Quantization (PQ) image comprised of a High Dynamic Range (HDR) signal conforming to Perceptual Quantization (PQ), and information relating to a maximum luminance value of the PQ image, a conversion unit to convert the PQ image into a Hybrid Log Gamma (HLG) image comprised of an HDR signal conforming to Hybrid Log Gamma (HLG), and to convert the information relating to the maximum luminance value, and an association unit to associate the HLG image with the converted information relating to the maximum luminance value. The conversion unit converts the PQ image into the HLG image and converts the information relating to the maximum luminance by applying a transfer function including an electro-optical transfer function conforming to the PQ (PQ EOTF) and, thereafter, applying a transfer function including an opto-electronic transfer function conforming to the HLG (HLG OETF).

19 Claims, 12 Drawing Sheets

(52) U.S. Cl.
CPC .............. *G06T 2207/20208* (2013.01); *G09G 2320/066* (2013.01); *G09G 2320/0673* (2013.01)

(58) Field of Classification Search
USPC .......................................................... 345/589
See application file for complete search history.

(56) References Cited

U.S. PATENT DOCUMENTS

| | | | | |
|---|---|---|---|---|
| 2020/0013198 | A1* | 1/2020 | Endo | G06T 7/80 |
| 2020/0074602 | A1* | 3/2020 | Matsuoka | G06T 7/90 |
| 2020/0351524 | A1* | 11/2020 | Lee | H04N 19/182 |
| 2021/0241055 | A1* | 8/2021 | Miyazaki | H04N 1/6027 |
| 2021/0241056 | A1* | 8/2021 | Miyazaki | G09G 5/10 |
| 2022/0295020 | A1* | 9/2022 | Su | G06T 7/90 |
| 2023/0005110 | A1* | 1/2023 | Kagawa | G06T 5/94 |
| 2023/0054046 | A1* | 2/2023 | Xu | G06T 5/92 |
| 2023/0351562 | A1* | 11/2023 | Zhao | G06T 5/60 |
| 2024/0153051 | A1* | 5/2024 | Xu | G06T 5/50 |
| 2024/0267530 | A1* | 8/2024 | Su | H04N 19/85 |

* cited by examiner

FIG. 12

| Nominal peak luminance(cd/m$^2$) | Display Gamma |
|---|---|
| 400 | 1.03 |
| 600 | 1.11 |
| 800 | 1.16 |
| 1000 | 1.20 |
| 1500 | 1.27 |
| 2000 | 1.33 |

IMAGE PROCESSING APPARATUS AND IMAGE PROCESSING METHOD

CROSS REFERENCE TO PRIORITY APPLICATION

This application claims the benefit of Japanese Patent Application No. 2023-001914, filed Jan. 10, 2023, which is hereby incorporated by reference herein in its entirety.

BACKGROUND OF THE INVENTION

Field of the Invention

The present invention relates to an image processing apparatus and an image processing method, and, in particular, to an image processing apparatus and an image processing method capable of handling high dynamic range (HDR) signals.

Description of the Related Art

The Hybrid Log Gamma (HLG) and the Perceptual Quantization (PQ) have been standardized for video signals that support a wider dynamic range than conventional video signals. In the HLG standard, an opto-electronic transfer function (OETF) indicating the relationship between the display luminance and the video signal level, that is, a characteristic on the image capture apparatus side, is specified. On the other hand, in the PQ standard, an electro-optical transfer function (EOTF) indicating the relationship between the video signal level and the display luminance, that is, a characteristic on the display device side, is specified. Also, while luminance is treated as a relative value in the HLG standard, luminance is treated as an absolute value in the PQ standard.

Japanese Patent Laid-Open No. 2021-90109 discloses that the maximum luminance value of the output dynamic range (units: [nits] or [cd/m2]) or the tone value (signal level) corresponding to the maximum luminance value is recorded, as a parameter called "maxDRL", in association with an HDR signal conforming to the PQ standard. Using the maxDRL makes it possible to appropriately map the luminance of an HDR signal conforming to the PQ standard (PQ HDR signal) to the luminance of an HDR signal conforming to the HLG standard (HLG HDR signal) or a standard dynamic range (SDR) signal.

A PQ HDR signal can be converted into an HLG HDR signal through a method such as that described in Report ITU-R BT.2408-5, "Guidance for operational practices in HDR television production", March 2022, ITU-R, <https://www.itu.int/dms_pub/itu-r/opb/rep/R-REP-BT.24Aug. 5, 2022-PDF-E.pdf>. In this case, the maxDRL originally recorded for the PQ HDR signal is not applicable to a converted HLG HDR signal. However, no proposal has been made regarding how to handle an accompanied parameter other than the HDR signal when converting a PQ HDR signal into an HLG HDR signal.

SUMMARY OF THE INVENTION

In one aspect, the present invention provides an image processing apparatus and an image processing method that allow a parameter related to an PQ HDR signal to be applicable to an HLG HDR signal converted from the PQ HDR signal.

According to an aspect of the present invention, an image processing apparatus comprises one or more processors that execute a program stored in a memory and thereby function as: an acquisition unit configured to acquire a Perceptual Quantization (PQ) image comprised of a High Dynamic Range (HDR) signal conforming to Perceptual Quantization (PQ), and information relating to a maximum luminance value of the PQ image, which is associated with the PQ image; a conversion unit configured to convert the PQ image into a Hybrid Log Gamma (HLG) image comprised of an HDR signal conforming to Hybrid Log Gamma (HLG), and to convert the information relating to the maximum luminance value in the same manner as in the conversion of the PQ image to the HLG image, and an association unit configured to associate the HLG image with the converted information relating to the maximum luminance value.

According to another aspect of the present invention, an image processing method performed by an image processing apparatus comprises acquiring a Perceptual Quantization (PQ) image comprised of a High Dynamic Range (HDR) signal conforming to Perceptual Quantization (PQ), and information relating to a maximum luminance value of the PQ image, which is associated with the PQ image; converting the PQ image into a Hybrid Log Gamma (HLG) image comprised of an HDR signal conforming to Hybrid Log Gamma (HLG), converting the information relating to the maximum luminance value in the same manner as in the conversion of the PQ image to the HLG image, and associating the HLG image with the converted information relating to the maximum luminance value.

According to a further aspect of the present invention, a non-transitory computer-readable medium that stores a program executable by a computer, which, when executed by the computer, causes the computer to function as an image processing apparatus comprising an acquisition unit configured to acquire a Perceptual Quantization (PQ) image comprised of a High Dynamic Range (HDR) signal conforming to Perceptual Quantization (PQ), and information relating to a maximum luminance value of the PQ image, which is associated with the PQ image, a conversion unit configured to convert the PQ image into a Hybrid Log Gamma (HLG) image comprised of an HDR signal conforming to Hybrid Log Gamma (HLG), and to convert the information relating to the maximum luminance value in the same manner as in the conversion of the PQ image to the HLG image; and an association unit configured to associate the HLG image with the converted information relating to the maximum luminance value.

Further features of the present invention will become apparent from the following description of exemplary embodiments (with reference to the attached drawings).

BRIEF DESCRIPTION OF THE DRAWINGS

FIG. 12 is a table showing correspondence between luminance and display gamma.

DESCRIPTION OF THE EMBODIMENTS

Figure 1:
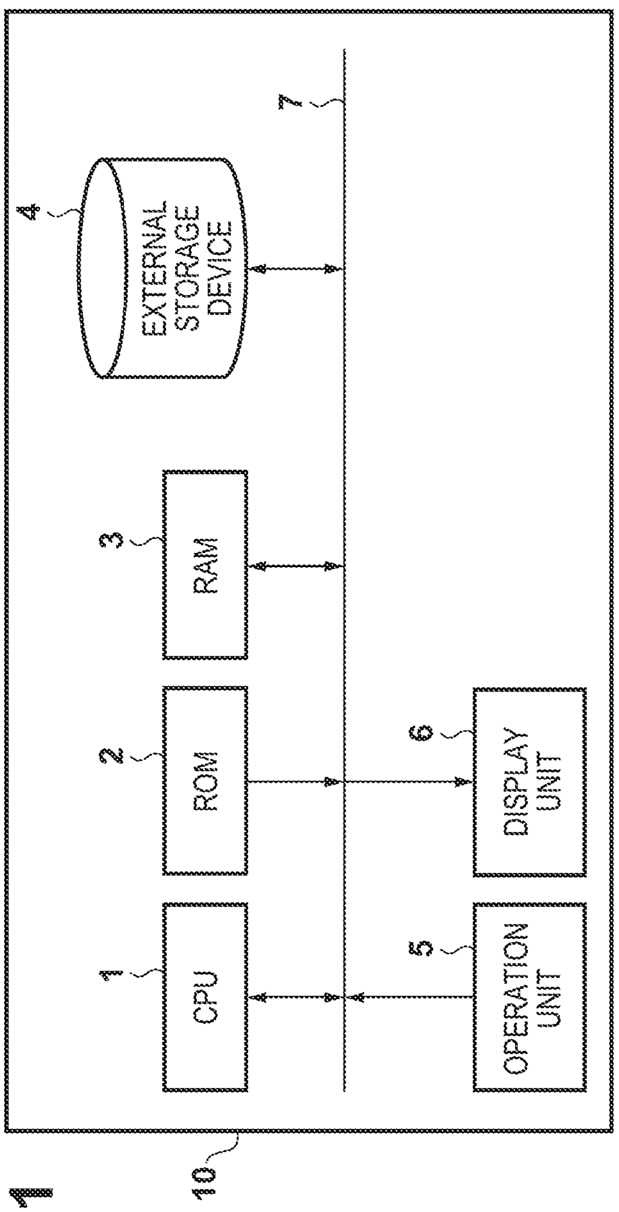
FIG. 1 is a block diagram showing a schematic configuration of an image processing apparatus according to an embodiment of the present invention.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and a redundant description thereof is omitted.

Note that, in the following embodiments, a case will be described in which the present invention is implemented in a computer device (e.g., a personal computer, a tablet computer, a media player, a PDA, etc.) serving as an example of an image processing apparatus. However, the present invention can be implemented with any electronic device that can handle HDR signals. Such electronic devices include image capture apparatuses, smartphones, game consoles, display devices, robots, drones, and drive recorders. These are just examples, and the present invention can be implemented with other electronic devices as well.

First Embodiment

The present invention is applicable to image data constituted by pixel data having a plurality of color components. For example, the image data may be image data generated by an image capture apparatus that uses an image sensor with a color filter. Note that a PQ HDR signal requires a depth of ten bits or more per component. Accordingly, a data format that supports a depth of ten bits or more is used.

Here, as an example, a data format compliant with the High Efficiency Image File Format (HEIF) standardized by ISO/IEC 23008-12 is used. In the HEIF, data for related images other than the main image and its thumbnail can be stored in one data file. For example, as related image data, it is possible to store still image or moving picture data with a depth of ten bits, which is encoded using an encoding method compliant with the H.265 or High Efficiency Video Codec (HEVC) standard.

In the following, unless otherwise specified, it is assumed that an HEIF-format data file in which a PQ-format HDR signal is recorded as main image data and a maxDRL relating to the main image is recorded in metadata is handled.

FIG. 1 is a block diagram showing an example of a functional configuration of an image processing apparatus 10 according to an embodiment. The image processing apparatus 10 includes a CPU 1, a ROM 2, a RAM 3, an external storage device 4, an operation unit 5, a display unit 6, and a system bus 7.

The CPU 1 implements the operations of the image processing apparatus 10 described below by loading programs stored in the ROM 2 and the external storage device 4 into the RAM 3 and executing them. Note that, although one CPU 1 is shown in FIG. 1, in actuality, multiple CPUs may work together.

The ROM 2 is an electrically-rewritable nonvolatile memory. The ROM 2 stores control programs such as a BIOS, which is required for starting up the image processing apparatus 10, as well as programs, parameters, and data that do not require modification.

The RAM 3 has a work region for the CPU 1, a primary storage region for temporarily storing various types of data, a load region for various programs, a video memory region for the display unit 6, and the like.

The external storage device 4 stores basic software (OS), various control programs, various application programs executable on the OS, various types of data, and the like. The external storage device 4 is, for example, a hard disk drive (HDD), a solid state drive (SSD), a storage device using removable media, or the like. The external storage device 4 may also be removable.

The external storage device 4 stores a plurality of application programs including, for example, the following application programs.

An application program for applying so-called developing processing to RAW-format image data in which pixels have one color component. An application program for converting the format of an HDR signal from the PQ format to the HLG format. The operation unit 5 is one or more input devices that can be operated by the user, such as a keyboard, a mouse, and a touch panel. The CPU 1 detects an operation on the operation unit 5 and executes processing according to the detected operation.

The display unit 6 is, for example, a liquid crystal display (LCD) or an organic EL display. The display unit 6 may also be an external device. The display unit 6 displays various types of information through the user interface of the OS and application programs running on the image processing apparatus 10.

The system bus 7 communicably connects each of the functional blocks described above.

Figure 2:
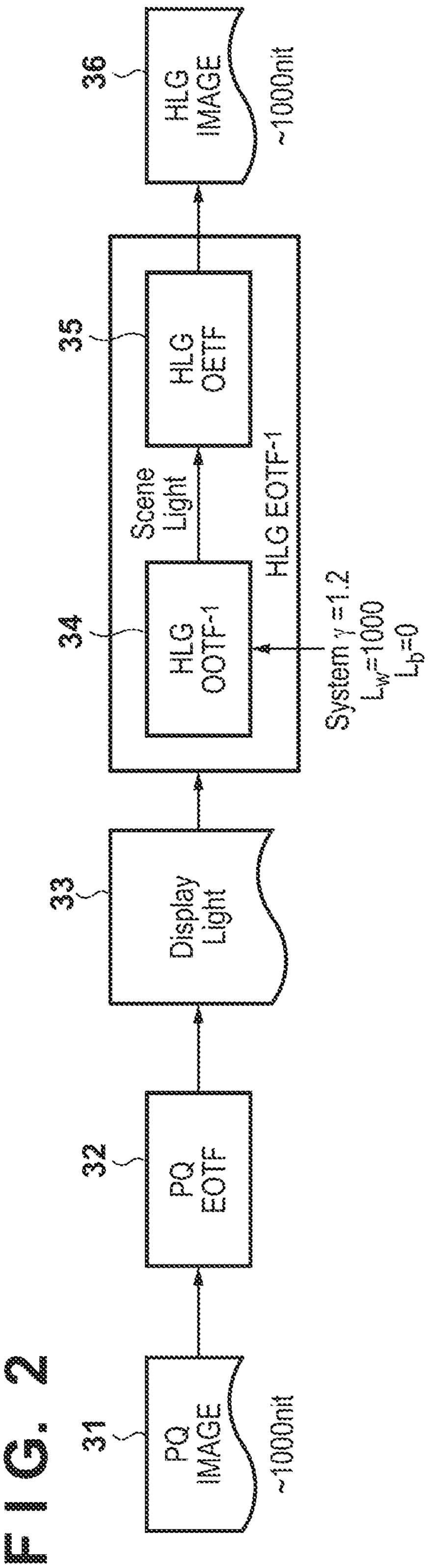
FIG. 2 is a diagram showing a conversion model for conversion from a PQ HDR signal to an HLG HDR signal.

FIG. 2 shows a conversion model for conversion from a PQ HDR signal to an HLG HDR signal, described in Report ITU-R BT.2408-5. Hereafter, an image comprised of a PQ HDR signal will be referred to as a PQ image, and an image comprised of an HLG HDR signal will be referred to as an HLG image. When generating a PQ image 31, scene luminance is converted into a signal value using the PQ $EOTF^{-1}$. For this reason, by applying the PQ EOTF 32, the signal value is converted to display luminance (Display Light). Note that $EOTF^{-1}$ is the inverse function of the electro-optical transfer function (EOTF). The same applies to an opto-optical transfer function (OOTF) and the opto-electronic transfer function (OETF). The opto-optical transfer function (OOTF) is a transfer function that converts subject luminance (Scene Light) to display luminance (Display Light).

Since the display luminance reflects the intention of the production, the display luminance is converted into scene luminance (Scene Light) by applying HLG $OOTF^{-1}$ 34. Thereafter, by applying the HLG OETF 35, an HLG image 36 is obtained. Note that the combination of the HLG $OOTF^{-1}$ 34 and the HLG OETF 35 corresponds to the HLG $EOTF^{-1}$.

Report ITU-R BT.2408-5 describes $\gamma$=1.2, the maximum display light Lw=1000 [nit], and black display light $L_B$=0 [nit], as standard parameter values. These parameter values are set in the HLG $OOTF^{-1}$ 34. With this conversion method, changes in luminance due to conversion can be avoided by matching the maximum luminance of the PQ image to the maximum luminance of the HLG image (1000 [nit] in this case).

However, the unconverted PQ image and the converted HLG image have different signal values corresponding to the maximum luminance. For example, if the maximum luminance of the PQ image is 650 [nit] and the signal value is 721, the corresponding signal value in the converted HLG image will be 955. Accordingly, if the signal level corresponding to the maximum luminance for the PQ image is recorded as maxDRL, it cannot be used for the converted HLG image.

Accordingly, in this embodiment, when converting a PQ image to an HLG image, the maxDRL for the PQ image is also converted to a value suitable for the HLG image.

Figure 3:
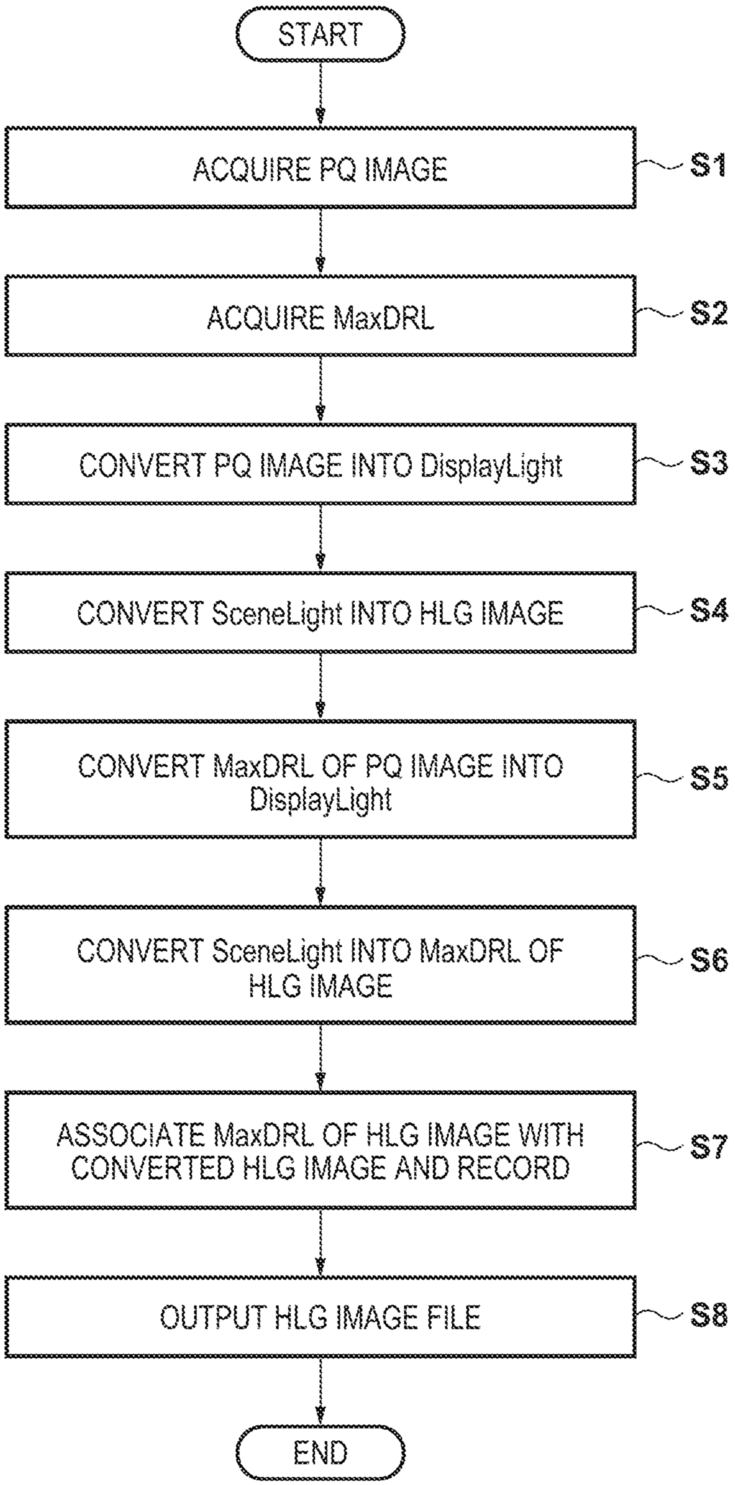
FIG. 3 is a flowchart showing an example of image processing corresponding to an embodiment of the present invention.

FIG. 3 is a flowchart regarding conversion processing from a PQ image to an HLG image, which is performed by the CPU 1 in this embodiment by executing a PQ-HLG conversion application program stored in the external storage device 4, for example.

Here, it is assumed that an HEIF-format PQ image is generated by an image capture apparatus, and the subject optical image is converted into a signal value according to the OETF of the image capture apparatus. It is also assumed that a parameter maxDRL regarding the maximum luminance of the PQ image is recorded as metadata in the data file in which the PQ image is stored.

Also, information on the transfer functions (OOTF, OETF, EOTF, and their inverse functions) conforming to the PQ standard and the HLG standard can be stored in the ROM 2 or the external storage device 4. Note that, as long as PQ EOTE, PQ OOTE, HLG OETF, and HLG OOTF are stored, the other transfer functions can be obtained. For example, PQ OETF can be obtained from PQ OOTF and PQ $EOTF^{-1}$.

In step S1, the CPU 1 acquires the PQ image 31 and loads it to the RAM 3. Although it is assumed here that the PQ image 31 is acquired from an HEIF-format data file stored in the external storage device 4, the PQ image 31 may also be acquired from an external device that can communicate through an external interface that the image processing apparatus 10 has.

In step S2, the CPU 1 acquires the maxDRL for the PQ image 31 from the data file in which the PQ image 31 is stored, and stores the acquired maxDRL in the RAM 3.

Figure 4A:
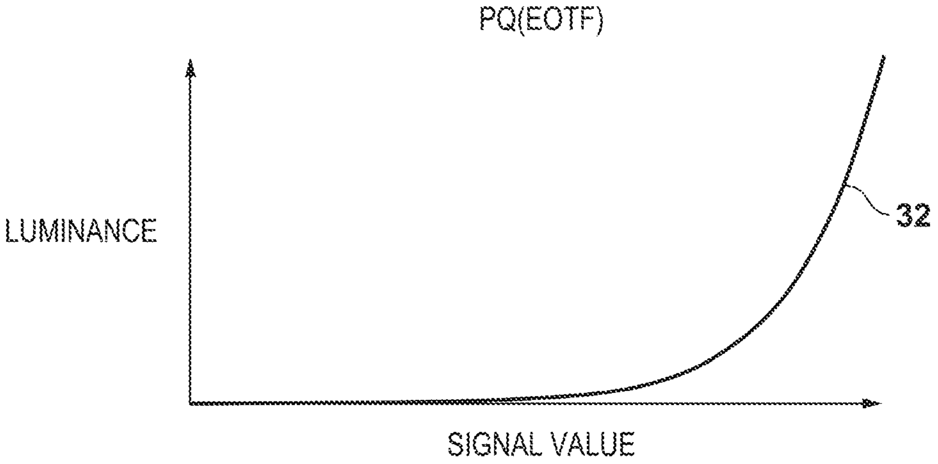
FIGS. 4A and 4B are diagrams showing an EOTF characteristic of the ITU-R BT.2100 (PQ) standard and an OETF characteristic of the ITU-R BT.2100 (HLG) standard.

In step S3, the CPU 1 converts the signal values of the PQ image 31 into display luminance (Display Light) by applying the PQ EOTF 32 shown in FIG. 4A to the signal values of the pixels forming the PQ image 31. By applying the PQ EOTF 32, the non-linearity of the OETF applied when generating the PQ image 31 is removed, and therefore Display Light is a linear signal.

In step S4, the CPU 1 converts Display Light 33 to Scene Light by applying HLG $OOTF^{-1}$ to the Display Light 33. Scene Light is a signal corresponding to the subject luminance. The $OOTF^{-1}$ can be obtained by combining (multiplying) the $EOTF^{-1}$ and the $OETF^{-1}$, but may also be stored in the ROM 2 or the external storage device 4 in advance. Also, the system parameters ($\gamma$, $L_W$, $L_B$) used for the $OOTF^{-1}$ may be those described above.

Figure 4B:
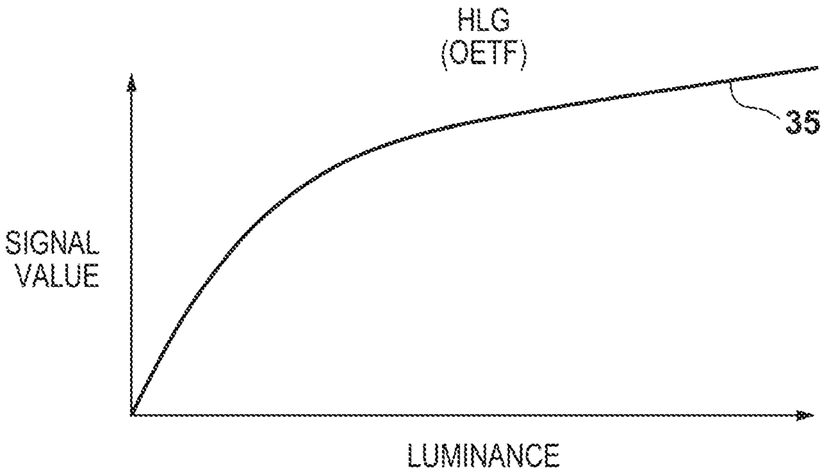

Then, the CPU 1 converts the Scene Light to the signal values of the HLG image 36 by applying the HLG OETF 35 as shown in FIG. 4B to the Scene Light.

Figure 5:
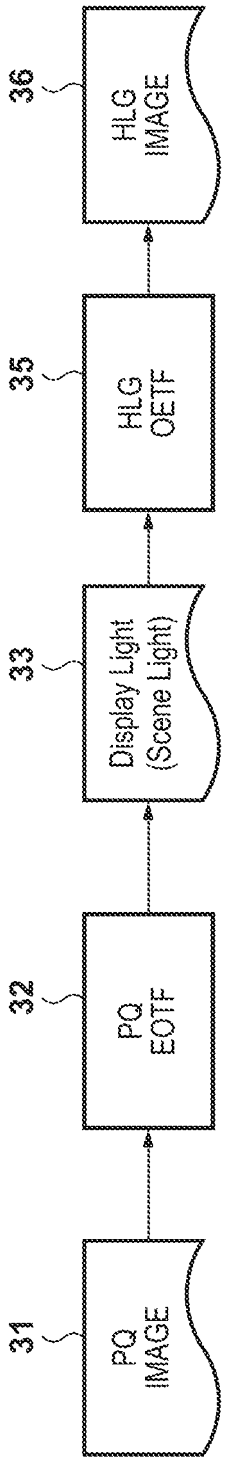
FIG. 5 shows another conversion model for conversion from a PQ HDR signal to an HLG HDR signal.

Note that, in step S4, the Display Light 33 may be regarded as the Scene Light and the HLG OETF 35 may be applied without converting the Display Light 33 to the Scene Light using the $OOTF^{-1}$. In this case, the HLG image 36 is obtained through the conversion procedure shown in FIG. 5.

In steps S5 and S6, the CPU 1 converts the maxDRL of the PQ image to the maxDRL of the HLG image in the same manner as in steps S3 and S4. Specifically, in step S5, the CPU 1 applies the PQ EOTF 32 to the maxDRL of the PQ image acquired in step S2 to convert it to the value of the Display Light.

Then, in step S6, the CPU 1 applies the HLG $OOTF^{-1}$ to the maxDRL converted to the Display Light value, to convert it to the Scene Light value. Furthermore, the CPU 1 applies the HLG OETF 35 to the maxDRL converted to the Scene Light value to convert it to the maxDRL of the HLG image 36. Here as well, the HLG OETF 35 may be applied directly to the maxDRL converted to the Display Light value to convert it to the maxDRL of the HLG image 36.

In step S7, the CPU 1 generates an HEIF-format data file in which the HLG image 36 obtained in step S4 is stored, and includes the maxDRL obtained in step S6 as metadata.

In step S8, the CPU 1 records the data file of the HLG image in the external storage device 4. Note that, although the HLG image and the converted maxDRL are included and recorded in the same data file here, they do not need to be recorded. For example, the CPU 1 may store the HLG image and the converted maxDRL in association with each other in the RAM 3, without recording them in the external storage device 4.

Figure 6A:
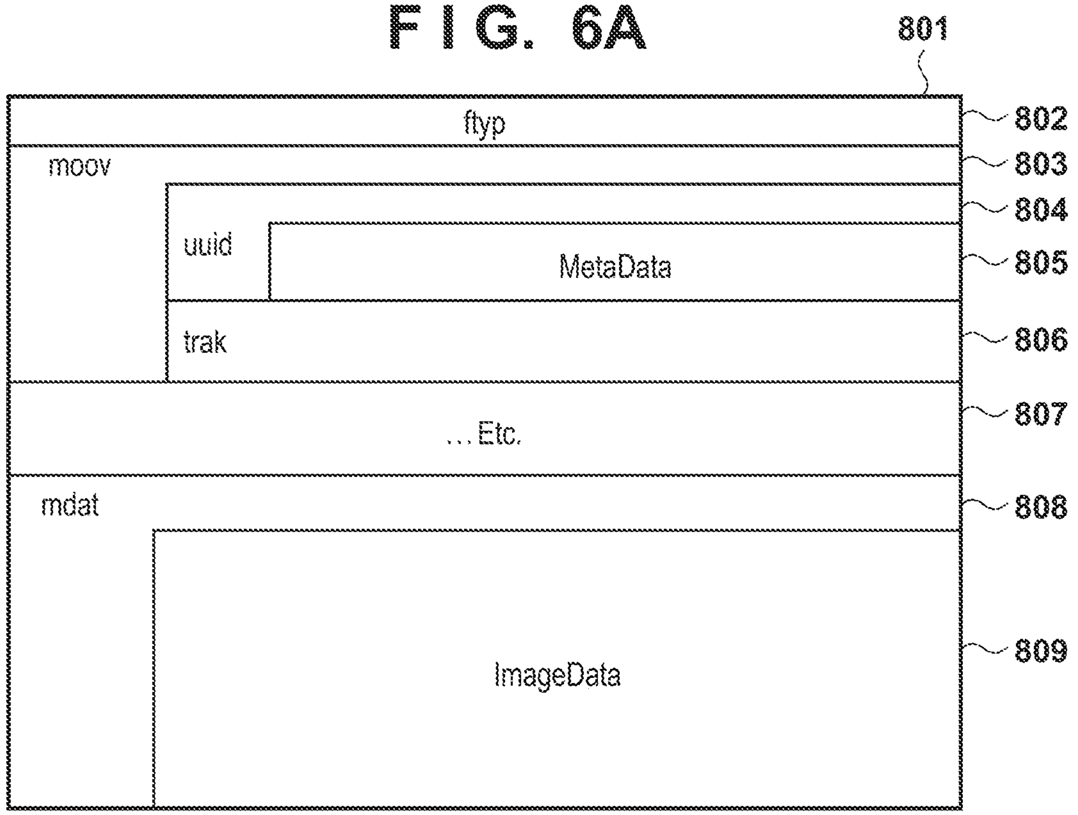
FIGS. 6A and 6B are diagrams showing an example of a data file structure used in a first embodiment of the present invention.

FIG. 6A is a diagram showing an example of the file structure of an HEIF-format data file used for PQ images and HLG images in this embodiment. An ftype 802 is a container (region) that stores header information. MetaData 805 stores metadata such as the maxDRL. Image data is stored in ImageData 809.

Figure 6B:
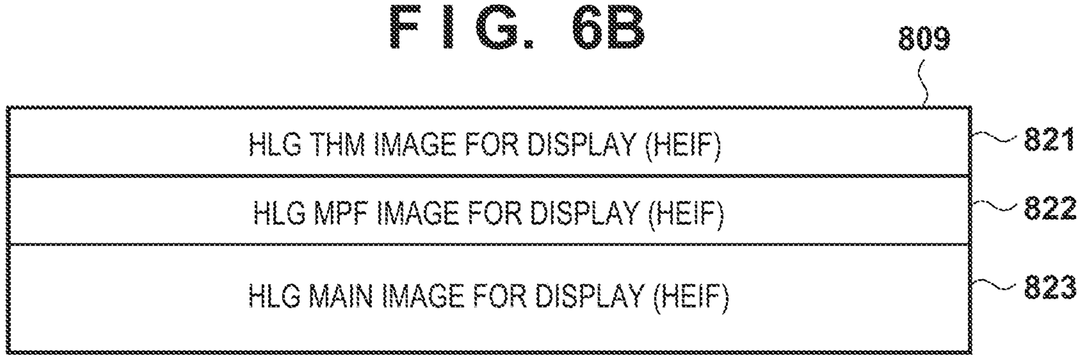

FIG. 6B is a diagram showing details of ImageData 809. ImageData 809 can store various types of image data. Here, it is assumed that ImageData 809 has a thumbnail region 821, a Multi Picture Format image region 822, and a main image region 823.

Thus, in this embodiment, when converting a PQ image into an HLG image, the maxDRL is also converted in the same manner as the image and is associated with the HLG image. Accordingly, even if the maximum signal value available in the HLG image (1023 in the case of a ten-bit depth) does not correspond to the maximum luminance value, appropriate processing can be executed based on the maxDRL.

Figure 7:
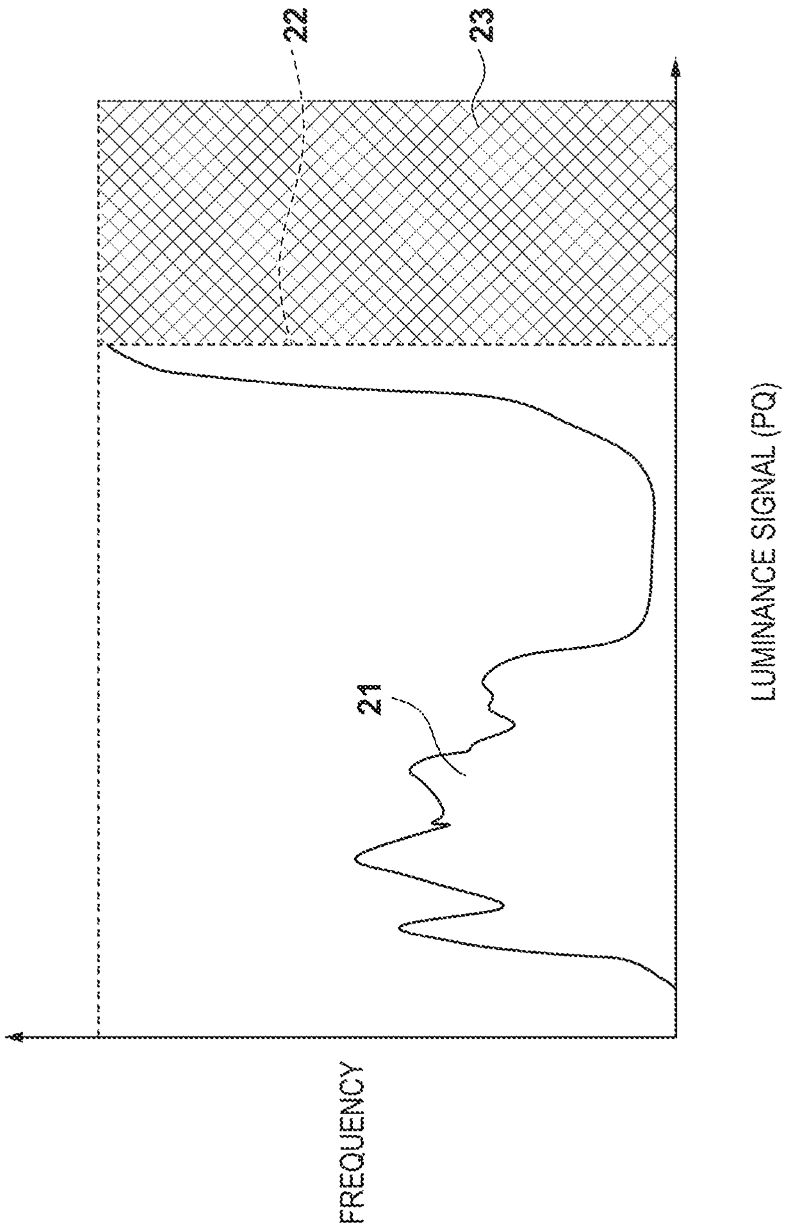
FIG. 7 shows an example of a histogram of a PQ image and shading of a saturated region.

For example, a case is considered in which a PQ image having a histogram as shown in FIG. 7 is converted into an HLG image. In a luminance histogram 21 of the PQ image shown in FIG. 7, a luminance range 23 that exceeds the maximum luminance value 22 corresponding to the maxDRL is shaded so that a user can easily understand the luminance saturation level of the PQ image.

Figure 8:
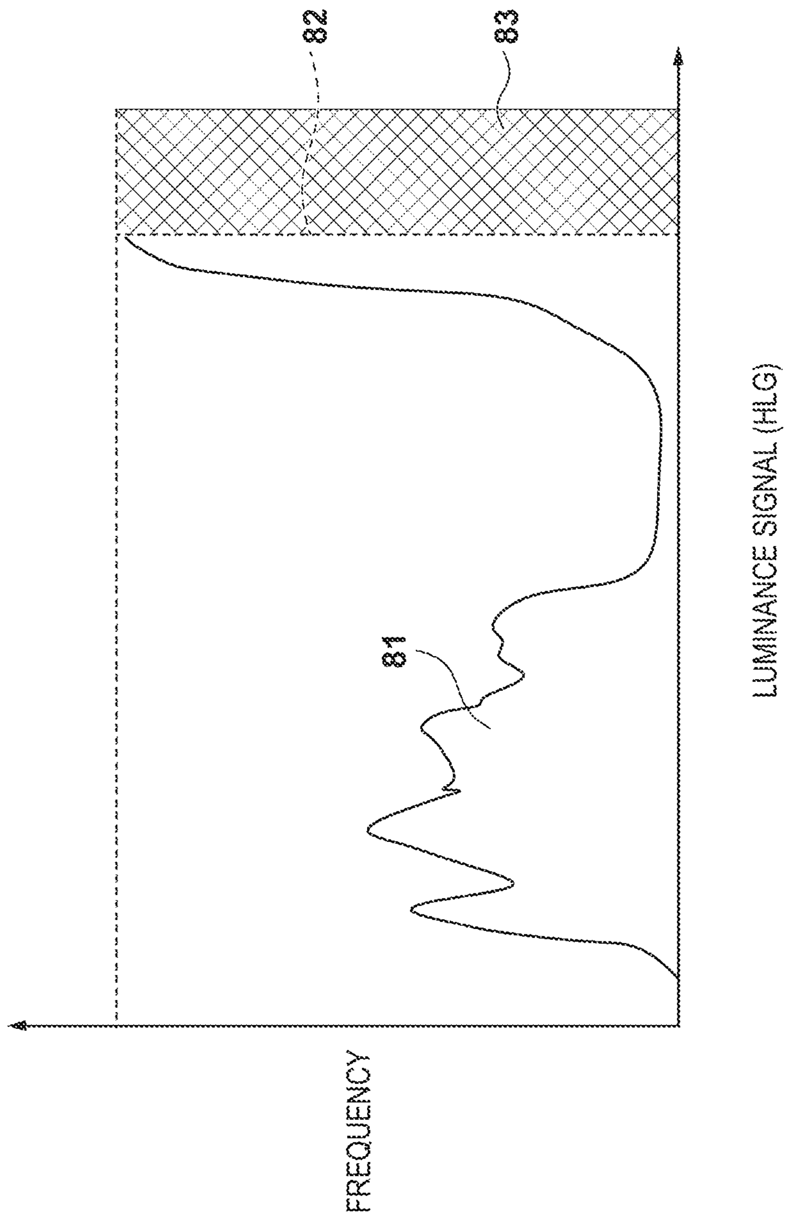
FIG. 8 shows an example of a histogram of a PQ image and shading of a saturated region.

In HLG images, in which luminance values are handled in a relative manner, the saturated luminance level is usually equal to the maximum signal value corresponding to the bit depth (1023 in the case of a ten-bit depth). However, when a PQ image is converted into an HLG image, the signal value corresponding to the saturated luminance level of the HLG image becomes smaller than the maximum signal value according to the maximum luminance of the PQ image. According to the present embodiment, it is possible to associate the maxDRL corresponding to the converted HLG image, and therefore it is possible to correctly understand the signal level corresponding to the maximum luminance value of the HLG image based on the maxDRL. For this reason, as shown in FIG. 8, in a luminance histogram 81 of the HLG image obtained by converting the PQ image, a luminance range 83 that exceeds a maximum luminance value 82 corresponding to the maxDRL can be clearly indicated and notified to the user.

Note that the method of using the maxDRL for the converted HLG image is not limited to the display of a luminance histogram. For example, the method can be used for any processing that depends on the maximum luminance, such as the display of a highlight region of the HLG image.

According to this embodiment, when converting a PQ image into an HLG image, parameters recorded for the PQ image are converted so that they are applicable to the converted HLG image. For this reason, even if the signal value corresponding to the maximum luminance of the HLG image is not the maximum signal value, processing depending on the maximum luminance of the HLG image can be appropriately executed.

Second Embodiment

Next, a second embodiment of the present invention will be described. In the first embodiment, a case has been described in which the maximum luminance of the HLG image used for the HLG OOTF$^{-1}$ is 1000 [nit] and the system gamma γ=1.2. This embodiment relates to a configuration in which the user can select these values.

Figure 9:
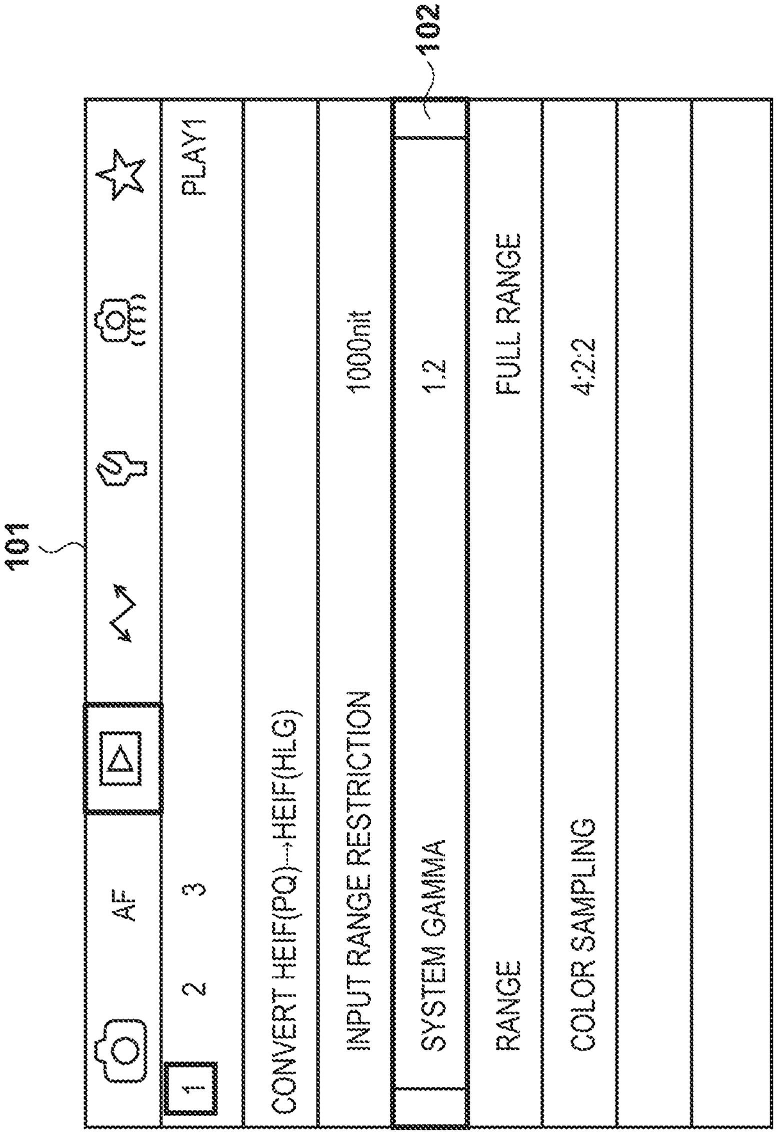
FIG. 9 shows an example of a GUI for configuring HEIF (PQ)→HEIF (HLG) conversion.

FIG. 9 shows an example of a configuration screen 101 displayed on the display unit 6 by the CPU 1 that executes a PQ-HLG conversion application program. The user of the image processing apparatus 10 can configure the system gamma 102 or the maximum luminance value [nit or cd/m2] of the HLG by operating the configuration screen through the operation unit 5. These values may be configurable from among predetermined options, or may be configurable by the user directly inputting the values.

When the configuration screen 101 is closed, the CPU 1 acquires the configuration value of the system gamma (or maximum luminance value) and stores it in the ROM 2, for example.

Figure 10:
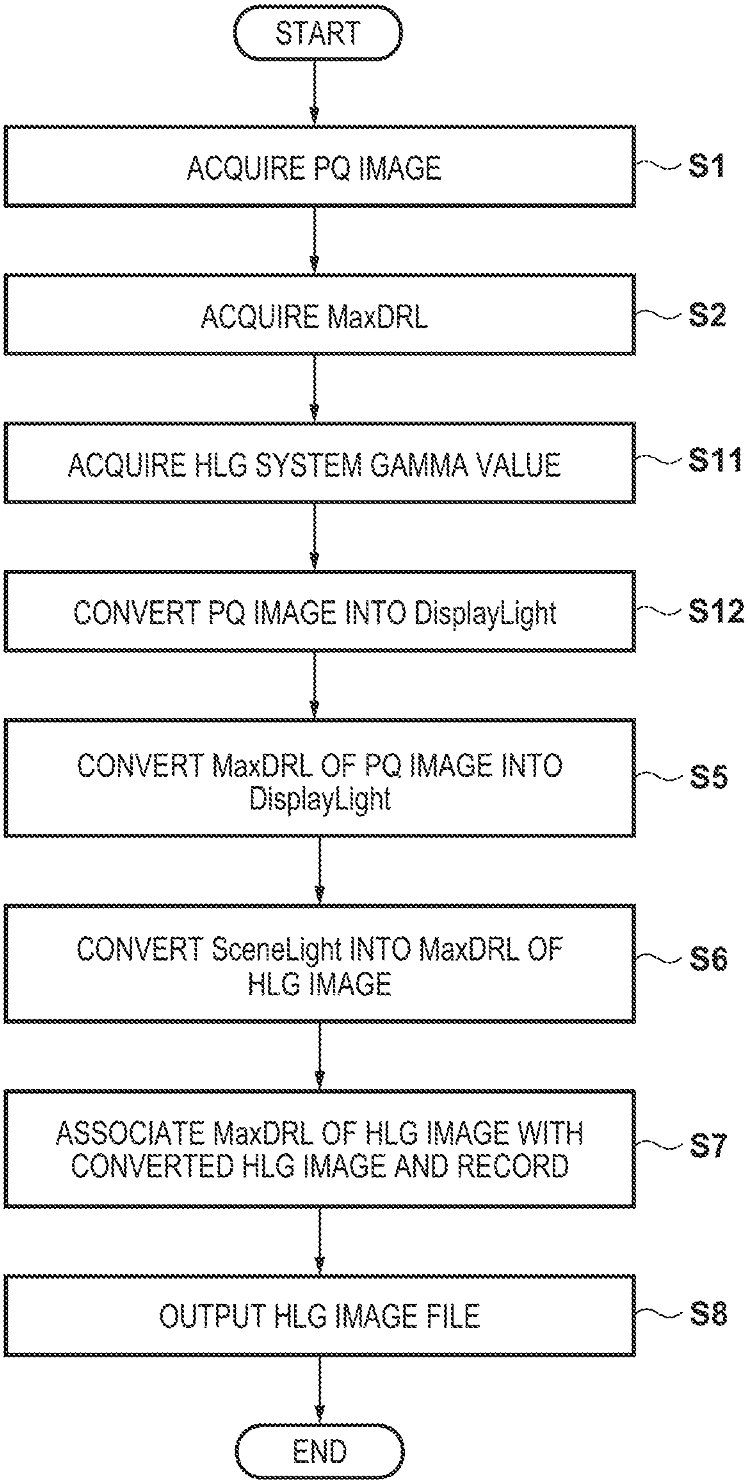
FIG. 10 is a flowchart showing an example of image processing according to a second embodiment of the present invention.

FIG. 10 is a flowchart regarding conversion processing from a PQ image to an HLG image, which is performed by the CPU 1 in this embodiment by executing a PQ-HLG conversion application program stored in the external storage device 4, for example. Steps for performing the same operations as in the first embodiment are given the same reference numerals as in FIG. 3, and descriptions thereof are omitted. The HEIF-format PQ image data file described in the first embodiment is handled in this embodiment as well.

Figure 11:
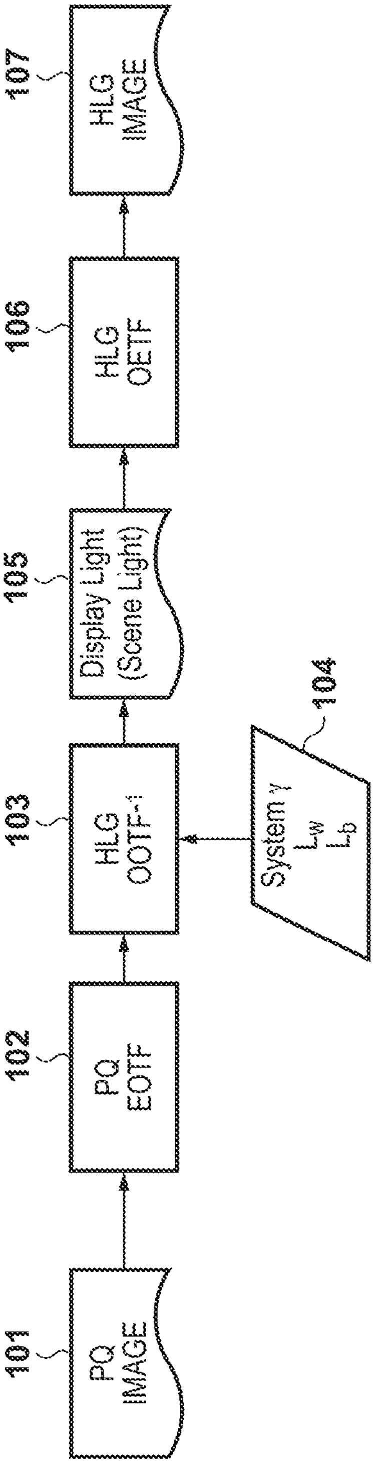
FIG. 11 is a diagram showing a conversion model for conversion from a PQ HDR signal to an HLG HDR signal in the second embodiment of the present invention.

The PQ-HLG conversion processing in this embodiment will be described below with reference to the conversion model shown in FIG. 11.

In step S11, the CPU 1 refers to the ROM 2 and acquires the system gamma configuration value (or maximum luminance value).

In step S12, the CPU 1 applies the PQ EOTF 102 to the PQ image 101 stored in the RAM 3, as in the first embodiment. Then, the CPU 1 applies the HLG OOTF$^{-1}$ 103. In this way, in this embodiment, the PQ image 101 is converted into the Display Light 105 by applying the PQ EOTF 102 and the HLG OOTF$^{-1}$ 103 to the PQ image 101.

Then, the system parameters 104 including the system gamma (or maximum display luminance Lw) acquired in step S11 are applied to the HLG OOTF$^{-1}$. Note that the black display luminance $L_B$ is set to zero here as well.

Thereafter, the processing of step S4 and onward is the same as in the first embodiment. That is, as described with reference to FIG. 5, the CPU 1 generates the HLG image 107 by regarding the Display Light 105 as Scene Light and applying the HLG OETF 106. Also, after converting the maxDRL in the same manner as for the PQ image, the converted maxDRL is recorded as the metadata of the HLG image.

According to this embodiment, it is possible to execute PQ-HLG conversion with consideration given to the gamma of the display device that displays the converted HLG image, and it is possible to perform appropriate display according to the gamma of the display device that displays the HLG image. Also, as in the first embodiment, it is possible to realize the effect of obtaining an appropriate maxDRL for the converted HLG image.

Third Embodiment

Next, a third embodiment of the present invention will be described. In the second embodiment, PQ-HLG conversion was performed with consideration given to the configured system gamma. In this embodiment, an HLG image is generated for each of a plurality of predetermined system parameters.

FIG. 12 is an example of the maximum display luminance and the gamma value for a typical display device, as described in Report ITU-R BT.2408-5. In this embodiment, in the conversion model shown in FIG. 11, each of a plurality of system parameters 104 having different values as shown in FIG. 12, for example, is applied to the HLG OOTF$^{-1}$ 103. Other operations are the same as in the second embodiment.

However, in this embodiment, since HLG images and maxDRLs equal to the number of types of system parameters are generated from a PQ image of one frame, the configurations of the MetaData 805 and the Image Data 809 of the data file in which HLG images are stored are different from each other. HEIF-format data files can store multiple images in one file, and, therefore, the number of data files will not increase.

Figure 13:
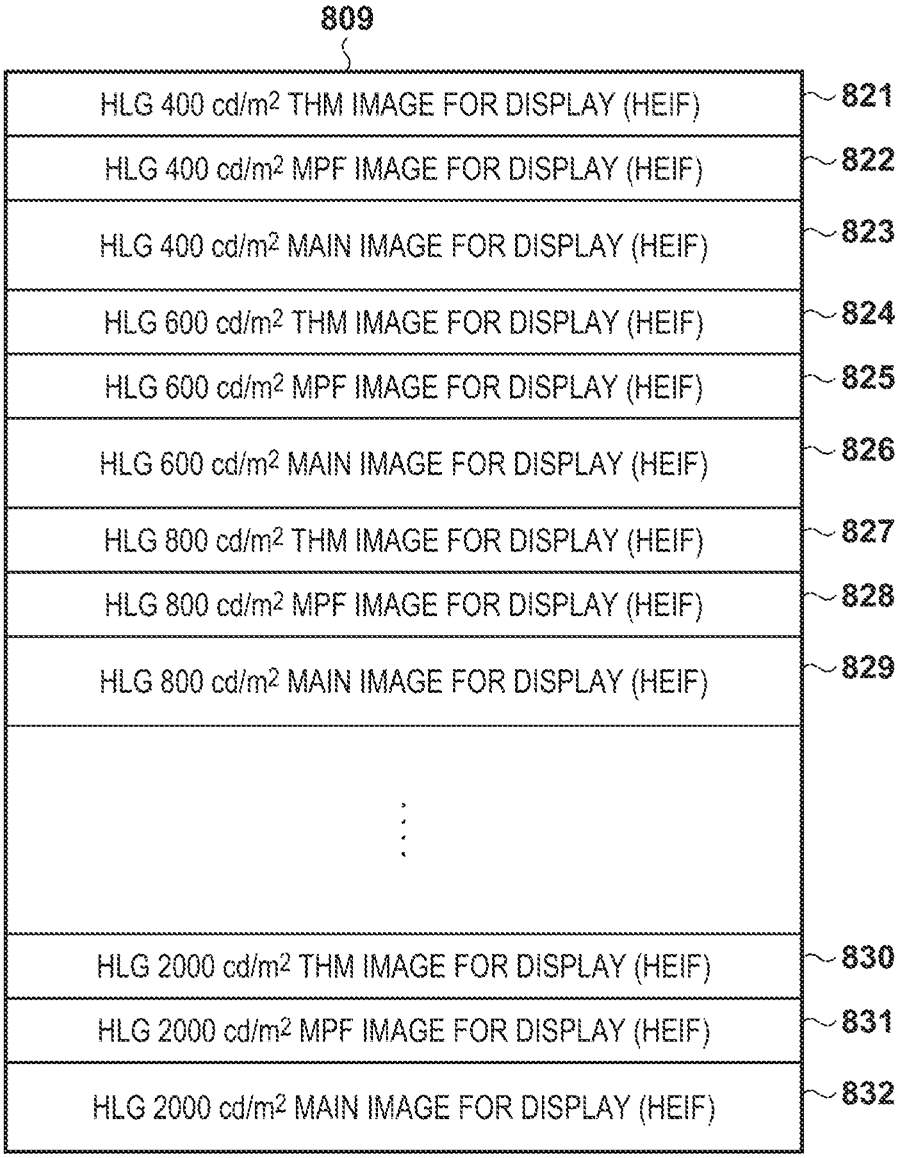
FIG. 13 is a diagram showing an example of a data file structure used in a third embodiment of the present invention.

FIG. 13 is a diagram showing the data structure of the Image Data 809 in the HEIF-format HLG image data file recorded in this embodiment. Thumbnails, Multi Picture Format, and main images are stored in sequence according to individual system parameters. For example, images related to the system parameters of a maximum display luminance of 400 [nit] and a display gamma of 1.03 are stored in regions 821 to 823. Also, images related to the system parameters of a maximum display luminance of 600 [nit] and a display gamma of 1.11 are stored in regions 824 to 826. Similarly, images related to the system parameters of a maximum display luminance of 200 [nit] and a display gamma of 1.33 are stored in regions 827 to 832.

Similarly, for the MetaData 805, maxDRLs corresponding to the system parameters are sequentially stored.

When displaying an HLG image from the HLG image data file generated in this embodiment, for example, the display program acquires HLG image data that matches the gamma or maximum display luminance of the display device from the Image Data 809 and uses the acquired HLG image data for display. Also, when using a maxDRL as well, a maxDRL that matches the gamma or maximum display luminance of the display device is acquired from the Meta-Data 805 and used. Note that the display program may be, for example, an application program running on a computer device. Alternatively, if the HLG image data file is recorded on a recording medium such as an optical disc, the display program may be a program that runs on a drive that plays back the recording medium.

In this embodiment, when converting a PQ image into an HLG image, HLG images corresponding to each of a plurality of system parameters having different values are generated. For this reason, it is possible to display an HLG image that is suitable for the system parameters of the environment in which the HLG image is displayed. Also, since a maxDRL is also generated and recorded for each system parameter value, it is possible to use a maxDRL that is suitable for the HLG image used for display.

Other Embodiments

Instead of applying a transfer function, a lookup table in which the discrete signal values of the PQ image are associated with the values of the Display Light, and a lookup table in which discrete values of the Scene Light and signal values of the HLG image are associated with each other may also be used. For example, instead of applying PQ EOTF, a value of the Display Light corresponding to the signal value of each pixel forming the PQ image is determined by referring to a lookup table. A signal value not stored in the lookup table can be obtained by interpolating the value of the Display Light according to the difference from a stored signal value. Similarly, instead of applying the HLG OETF, the value of an individual pixel of the Scene Light (Display Light) can also be converted to a signal value of a pixel of an HLG image using a lookup table. The maxDRL can also be converted in the same way. For example, a lookup table can be used when processing speed is more important than conversion accuracy.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:

one or more processors that execute a program stored in a memory and thereby function as:

an acquisition unit configured to acquire a Perceptual Quantization (PQ) image comprised of a High Dynamic Range (HDR) signal conforming to Perceptual Quantization (PQ), and information relating to a maximum luminance value of the PQ image, which is associated with the PQ image and recorded as metadata in a data file in which the PQ image is stored;

a conversion unit configured to convert the PQ image into a Hybrid Log Gamma (HLG) image comprised of an HDR signal conforming to Hybrid Log Gamma (HLG), and to convert the information relating to the maximum luminance value of the PQ image into information relating to a maximum luminance value of the HLG image; and an association unit configured to associate the HLG image with the converted information relating to the maximum luminance value, wherein the conversion unit converts the PQ image into the HLG image and converts the information relating to the maximum luminance by applying a transfer function including an electro-optical transfer function (EOTF) conforming to the PQ (PQ EOTF) and, thereafter, by applying a transfer function including an opto-electronic transfer function (OETF) conforming to the HLG (HLG OETF).

2. The image processing apparatus according to claim 1, wherein the transfer function including the PQ EOTF converts the PQ image into a display luminance, and the transfer function including the HLG OETF includes an inverse function of an opto-optical transfer function (OOTF) conforming to the HLG (HLG $OOTF^{-1}$) that converts the display luminance into a subject luminance, and the HLG OETF.

3. The image processing apparatus according to claim 1, wherein the transfer function including the PQ EOTF includes an inverse function of an HLG OOTF (HLG $OOTF^{-1}$) that is to be applied after the PQ EOTF, and a system parameter to be applied to the HLG OOTF is configurable by a user.

4. The image processing apparatus according to claim 1, wherein the transfer function including the PQ EOTF includes an inverse function of an HLG OOTF (HLG $OOTF^{-1}$) that is to be applied after the PQ EOTF, and, by applying a plurality of system parameters with different values to the HLG OOTF, the conversion unit generates a plurality of the HLG images from the PQ image, and generates the information relating to the maximum luminance value corresponding to each of the plurality of the HLG images.

5. The image processing apparatus according to claim 4, wherein the association unit records the plurality of the HLG images and the information relating to the maximum luminance value corresponding to each of the plurality of the HLG images in one data file.

6. The image processing apparatus according to claim 4, wherein the system parameter is a gamma value to be applied when displaying the HLG image, or the maximum luminance value of the HLG image.

7. The image processing apparatus according to claim 1, wherein the transfer function including the PQ EOTF converts the PQ image into a display luminance, and the transfer function including the HLG OETF is the HLG OETF that is to be applied to the display luminance.

8. The image processing apparatus according to claim 1, wherein the transfer function including the PQ EOTF converts the PQ image into a display luminance, and the transfer function including the HLG OETF includes an inverse function of an HLG OOTF (HLG $OOTF^{-1}$) that converts the display luminance into a subject luminance, and the HLG OETF.

9. The image processing apparatus according to claim 1, wherein the association unit associates the HLG image with the converted information relating to the maximum luminance value by recording the converted information as metadata in a data file in which the HLG image is stored.

10. An image processing method performed by an image processing apparatus, the method comprising:

acquiring a Perceptual Quantization (PQ) image comprised of a High Dynamic Range (HDR) signal conforming to Perceptual Quantization (PQ), and information relating to a maximum luminance value of the PQ image, which is associated with the PQ image and recorded as metadata in a data file in which the PQ image is stored;

converting the PQ image into a Hybrid Log Gamma (HLG) image comprised of an HDR signal conforming to Hybrid Log Gamma (HLG);

converting the information relating to the maximum luminance value of the PQ image into information relating to a maximum luminance value of the HLG image; and associating the HLG image with the converted information relating to the maximum luminance value, wherein the PQ image is converted into the HLG image and the information relating to the maximum luminance is converted by applying a transfer function including an electro-optical transfer function (EOTF) conforming to the PQ (PQ EOTF) and, thereafter, by applying a transfer function including an opto-electronic transfer function (OETF) conforming to the HLG (HLG OETF).

11. The image processing method according to claim 10, wherein the transfer function including the PQ EOTF converts the PQ image into a display luminance, and the transfer function including the HLG OETF includes an inverse function of an opto-optical transfer function (OOTF) conforming to the HLG (HLG $OOTF^{-1}$) that converts the display luminance into a subject luminance, and the HLG OETF.

12. The image processing method according to claim 10, wherein the transfer function including the PQ EOTF includes an inverse function of an HLG OOTF (HLG $OOTF^{-1}$) that is to be applied after the PQ EOTF, and a system parameter to be applied to the HLG OOTF is configurable by a user.

13. The image processing method according to claim 10, wherein the transfer function including the PQ EOTF includes an inverse function of an HLG OOTF (HLG $OOTF^{-1}$) that is to be applied after the PQ EOTF, and, by applying a plurality of system parameters with different values to the HLG OOTF, the conversion unit generates a plurality of the HLG images from the PQ image, and generates the information relating to the maximum luminance value corresponding to each of the plurality of the HLG images.

14. The image processing method according to claim 13, wherein the association unit records the plurality of the HLG images and the information relating to the maximum luminance value corresponding to each of the plurality of the HLG images in one data file.

15. The image processing method according to claim 13, wherein the system parameter is a gamma value to be applied when displaying the HLG image, or the maximum luminance value of the HLG image.

16. The image processing method according to claim 10, wherein the transfer function including the PQ EOTF converts the PQ image into a display luminance, and the transfer function including the HLG OETF is the HLG OETF that is to be applied to the display luminance.

17. The image processing method according to claim 10, wherein the transfer function including the PQ EOTF converts the PQ image into a display luminance, and the transfer function including the HLG OETF includes an inverse function of an HLG OOTF (HLG $OOTF^{-1}$) that converts the display luminance into a subject luminance, and the HLG OETF.

18. The image processing method according to claim 10, wherein the associating associates the HLG image with the converted information relating to the maximum luminance value by recording the converted information as metadata in a data file in which the HLG image is stored.

19. A non-transitory computer-readable medium storing instructions that, when executed by one or more processors, causes the one or more processors to perform:

acquiring a Perceptual Quantization (PQ) image comprised of a High Dynamic Range (HDR) signal conforming to Perceptual Quantization (PQ), and information relating to a maximum luminance value of the PQ image, which is associated with the PQ image and recorded as metadata in a data file in which the PQ image is stored;

converting the PQ image into a Hybrid Log Gamma (HLG) image comprised of an HDR signal conforming to Hybrid Log Gamma (HLG);

converting the information relating to the maximum luminance value of the PQ image into information relating to a maximum luminance value of the HLG image; and associating the HLG image with the converted information relating to the maximum luminance value, wherein the PQ image is converted into the HLG image and the information relating to the maximum luminance is converted by applying a transfer function including an electro-optical transfer function (EOTF) conforming to the PQ (PQ EOTF) and, thereafter, by applying a transfer function including an opto-electronic transfer function (OETF) conforming to the HLG (HLG OETF).

* * * * *